United States Patent
Osada et al.

(10) Patent No.: US 9,914,409 B2
(45) Date of Patent: Mar. 13, 2018

(54) AUTOMOTIVE SOUNDPROOFING MATERIAL AND WIRE HARNESS ASSEMBLY

(71) Applicant: Yazaki Corporation, Tokyo (JP)

(72) Inventors: Yasumasa Osada, Susono (JP); Kei Ikeda, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/057,385

(22) Filed: Mar. 1, 2016

(65) Prior Publication Data
US 2016/0176368 A1    Jun. 23, 2016

Related U.S. Application Data

(63) Continuation of application No. PCT/JP2014/074908, filed on Sep. 19, 2014.

(30) Foreign Application Priority Data

Sep. 27, 2013 (JP) ................................ 2013-202337

(51) Int. Cl.
*B60R 13/08* (2006.01)
*G10K 11/172* (2006.01)
(Continued)

(52) U.S. Cl.
CPC .......... *B60R 13/0846* (2013.01); *B60R 13/08* (2013.01); *B60R 16/0207* (2013.01); *B60R 16/0215* (2013.01); *G10K 11/168* (2013.01); *G10K 11/172* (2013.01); *H01B 7/0045* (2013.01)

(58) Field of Classification Search
None
See application file for complete search history.

(56) References Cited

U.S. PATENT DOCUMENTS 6,550,571 B1 * 4/2003 Kimura .................. E02F 9/163
                                                  181/200
8,127,405 B2 * 3/2012 Barger .................... F16L 3/233
                                                  24/16 R
(Continued)

FOREIGN PATENT DOCUMENTS

JP    1990-82815 U        6/1990
JP    H0282815 U     *    6/1990
(Continued)

OTHER PUBLICATIONS

International Search Report dated Nov. 4, 2014, issued for PCT/JP2014/074908.
(Continued)

*Primary Examiner* — Timothy Thompson
*Assistant Examiner* — Krystal Robinson
(74) *Attorney, Agent, or Firm* — Locke Lord LLP

(57) ABSTRACT

The present invention provides an automotive soundproofing material capable of providing a high sound absorption performance throughout a wide frequency band. In the automotive soundproofing material, flexible-porous body and sheet-shaped body are formed in a multi-layered structure, and the sheet-shaped body is comprised of a plurality of through holes formed therethrough.

7 Claims, 5 Drawing Sheets

(51) Int. Cl.
*G10K 11/168* (2006.01)
*B60R 16/02* (2006.01)
*H01B 7/00* (2006.01)

(56) References Cited

U.S. PATENT DOCUMENTS

2002/0098311 A1* 7/2002 Lindner ............ A44B 18/0092
428/40.1
2013/0098707 A1* 4/2013 Yamamoto ............ E04B 1/8409
181/290
2016/0329039 A1* 11/2016 Takata ................ B60R 13/0846

FOREIGN PATENT DOCUMENTS

| JP | 2003-295867 A | 10/2003 |
| JP | 2005-120247 A | 5/2005 |
| JP | 2006-240207 A | 9/2006 |
| JP | 2011-116086 A | 6/2011 |

OTHER PUBLICATIONS

Office Action dated Nov. 22, 2016 issued for corresponding Chinese Patent Application No. 201480047153.X.

* cited by examiner

AUTOMOTIVE SOUNDPROOFING MATERIAL AND WIRE HARNESS ASSEMBLY

TECHNICAL FIELD

The present invention relates to automotive soundproofing material arranged between automobile interior and automobile exterior for preventing automobile exterior sound from being incident into the automobile interior, and wire harness assembly into which wire harness is assembled.

BACKGROUND ART

To improve automobile interior silence, sounds of automobile exterior (including engine sound, sound of tire squeal of automobile while running or the like) are made absorbed by porous material, or composite material made of resin-sheet like-surface skin adhered to fiber material such as a flexible polyurethane foam or felt is arranged on rear-surface side of a member configuring a wall of the automobile interior (Patent Literatures 1 and 2).

Here, FIG. 5B schematically shows sound absorption characteristics (relationship between frequency of incident sound and sound absorption ratio) of a soundproofing material 1' when sound is made to be incident into the plate-like soundproofing material 1' composed of an urethane foam, as illustrated in FIG. 5A, for example. That is, sound absorption ratio with respect to sound regions excluding the high sound region depicted in shades in FIG. 5B is lowered.

As shown in FIG. 6A, in the case of a soundproofing material 1" combining an urethane foam 1a" with a resin sheet 1b", absorption ratio of sound regions excluding the middle sound region depicted in shades in FIG. 6B is lowered.

As such, on the one hand, an enhancement of high sound absorption performance in a limited sound region is enabled, on the other hand, by using the conventional soundproofing materials, a high sound absorption performance throughout a wide frequency band cannot be provided.

In view of the above, an automotive soundproofing material capable of providing high sound absorption performance throughout a wide frequency band has been in demand.

CITATION LIST

Patent Literatures

Patent Literature 1: JP 2006-240207 A
Patent Literature 2: JP 2005-120247 A

SUMMARY OF INVENTION

Technical Problem

An objective of the present invention is to properly address the above-mentioned problems, for example, to provide an automotive soundproofing material capable of exerting a high sound absorption performance throughout a wide frequency band, and a wire harness assembly having a similar soundproofing function thereto.

Solution to Problem

To solve the above-stated problems, there is provided an automotive soundproofing material of the present invention by multi-layering (e.g., laminating to each other) flexible porous body and sheet-shaped body, wherein the sheet-shaped body is characterized in comprising a plurality of through holes.

Further, the wire harness assembly of the present invention has a wire harness arranged within the automotive soundproofing material.

Advantageous Effects of Invention

An automotive soundproofing material and a wire harness assembly of the present invention is an automotive soundproofing material capable of providing a high sound absorption performance throughout a wide frequency band by virtue of a configuration of a sheet-shaped body through which a plurality of holes is formed, the automotive soundproofing material being formed by multi-layering the flexible-porous body and the sheet-shaped body.

DESCRIPTION OF EMBODIMENT

An automotive soundproofing material and a wire harness assembly of the present invention will be described hereinafter with reference to the drawings.

Figure 1A:
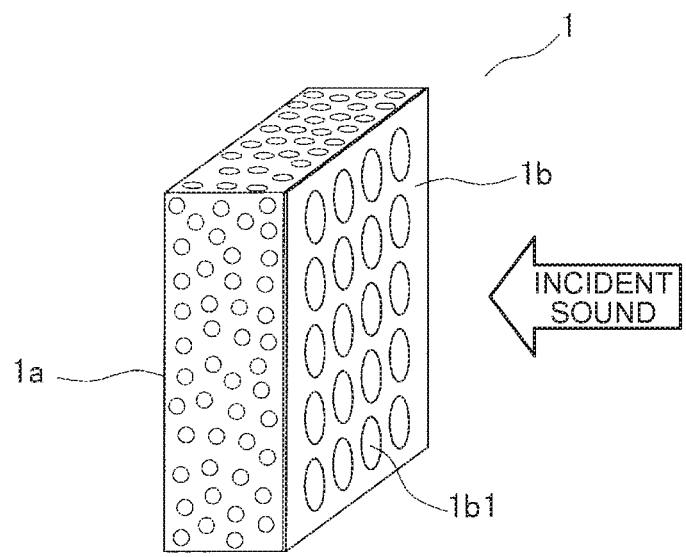
FIG. 1A is a schematical perspective view of an example 1 of automotive soundproofing material of the present invention
Figure 1B:
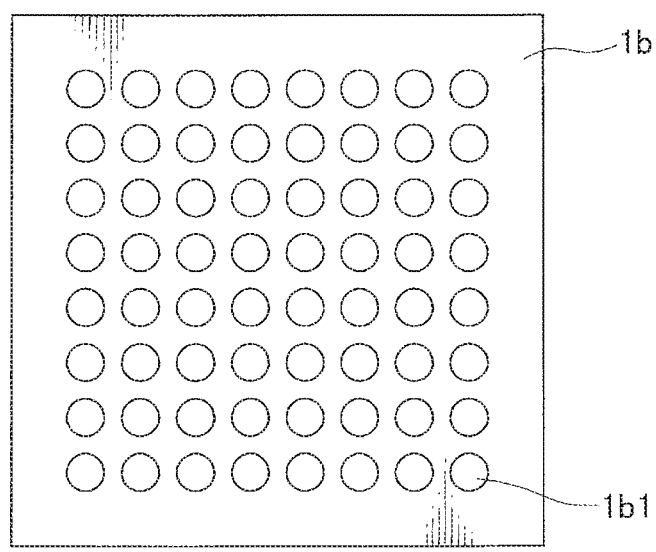
FIG. 1B is a front view of a sheet-shaped body $1b$.

FIG. 1A is a schematical perspective view of an example 1 of the automotive soundproofing material of the present invention, and FIG. 1B is a front view of a sheet-shaped body $1b$.

This automotive soundproofing material 1 is formed by multi-layering the flexible-porous body $1a$ and the sheet-shaped body $1b$, and the sheet-shaped body $1b$ is comprised of a plurality of through holes formed therethrough.

Figure 2:
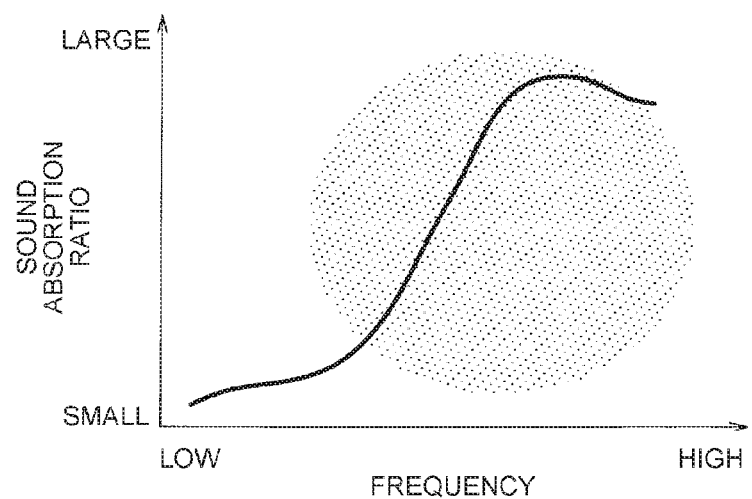
FIG. 2 is a schematical illustration showing sound absorption characteristics (relationship between frequency of incident sound and sound absorption ratio) in the example 1 of the automotive soundproofing material.
Figure 5A:
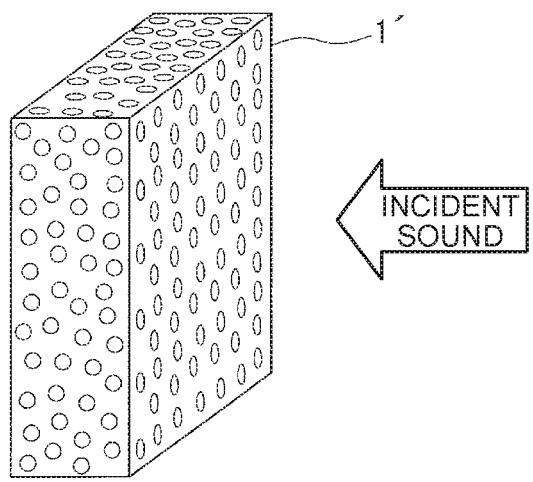
FIG. 5A is a schematical perspective view of an example of a conventional automotive soundproofing material 1'.
Figure 5B:
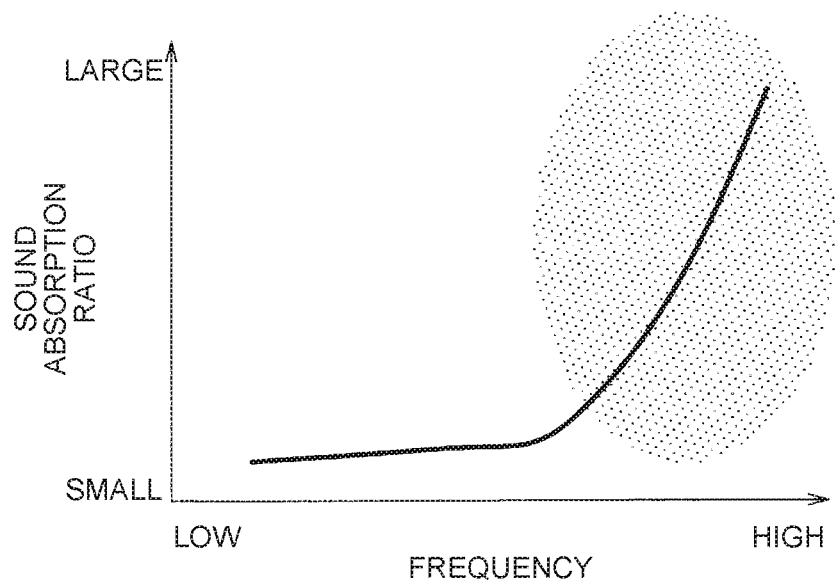
FIG. 5B is a schematical illustration showing sound absorption characteristics of the automotive soundproofing material 1'.
Figure 6A:
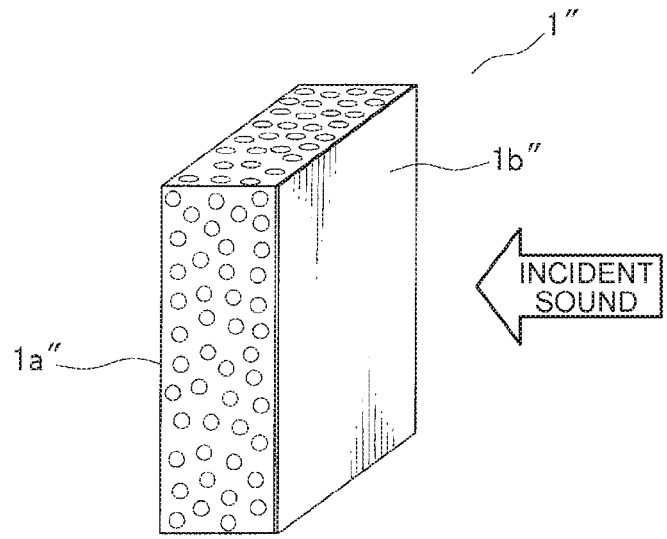
FIG. 6A is a schematical perspective view of an example of a conventional automotive soundproofing material 1".
Figure 6B:
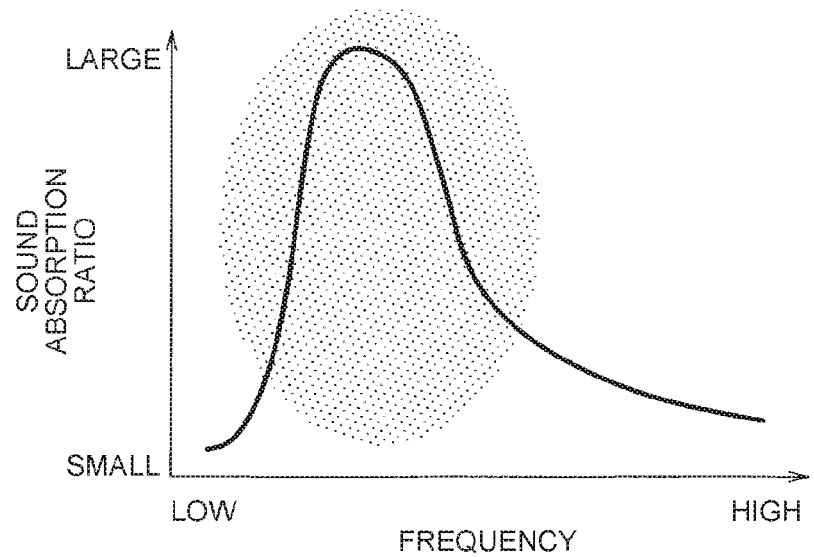
FIG. 6B is a schematical illustration showing sound absorption characteristics of the automotive soundproofing material 1".

Thanks to such a configuration, let us schematically show sound absorption characteristics of the automotive soundproofing material of the present invention, it can be seen in shades in FIG. 2, that high sound absorption performance is made enabled throughout a wide frequency band as compared to a case using the flexible-porous body by itself (see FIG. 5B) and a case where the flexible-porous body and the sheet-shaped body having no holes are formed in a multi-layered structure (see FIG. 6B).

The flexible-porous body used in the present invention can be exemplified by a foam composed by urethane resin and/or the like and having open cells. In the flexible-porous body 1a a lack of open cells may lead to insufficient soundproofing performance.

Materials and thickness of the porous body, a size of the cells and a bubble fraction exert influence on the sound absorption characteristics of the automotive soundproofing material 1. Hence, molding conditions when the porous body is molded (e.g., types of base resin, types and/or blending amount of foaming agent used, and molding temperatures), and process conditions after the mold process of the pre-porous body are properly adjusted so as to produce the porous bodies having required sound absorption characteristics.

In the present invention, it may also be used, as the flexible-porous body, non-woven fabric (including felt) composed of fiber(s) such as polypropylene and polyester (e.g., polyethylene terephthalate). In such a case, thickness and weight of the non-woven fabric are chosen as appropriate.

The sheet-shaped body used in the present invention can be exemplified by sheet-shaped bodies composed of vinyl chloride resin, polyethylene, polypropylene, polystyrene and various types of elastomers ("sheet-shaped body" of the present invention also encompasses films), and a foam sheet-shaped body made of the above-described materials. In a case where the foam sheet-shaped body is utilized, it is preferable that the foam includes open cells to obtain high sound absorption characteristic adjusting performance therewith.

Quality of material and thickness of the sheet-shaped body exert influence on sound absorption characteristics of the automotive soundproofing material. Hence, the quality of material and the thickness of the sheet-shaped body are properly chosen so that required sound absorption characteristics can be provided.

The sheet-shaped body is comprised of the plurality of through holes formed therethrough as described above. Sizes and arrangement density (aperture ratio is made set therefrom) exert influence on sound absorption characteristics of the automotive soundproofing material. Hence, the sizes and the arrangement density are suitably determined so that required sound absorption characteristics can be obtained therewith. Here, in order to provide high soundproofing performance throughout a wide frequency band, it is preferable that the diameter of the through hole when circularly formed, and the equivalent circle diameter of the through hole when not circularly formed ranges from 2.5 mm to 10 mm respectively, and the distance between the adjacent two through holes ranges from 10 mm to 18 mm. In such a case, the aperture ratio thereof shall approximately range from 3% to 40%.

Although the automotive soundproofing material of the present invention can be provided by multi-layering the above-described flexible-porous body and sheet-shaped body, the porous body and the sheet-shaped body may also be adhered to each other or they may also be thermal-fusion bonded to each other. Conditions of the adhesion and the fusion, that is, types of adhesives, the presence or absence of an adhesive layer of the flexible-porous body at an aperture portion of the sheet-shaped body, application weight of the adhesive, and a process condition such as temperature and duration time when the porous body and the sheet-shaped body are made fusion bonded to each other exert influence on sound absorption characteristics of the automotive soundproofing material. Hence, the adhesion condition or the fusion condition is suitably determined so that required sound absorption characteristics can be obtained therewith.

For example, when the flexible-porous body and the sheet-shaped body are adhered to each other, the automotive soundproofing material of the present invention can be obtained by the following processes: first, adhesive is applied to one surface of the sheet-shaped body, the one surface is subjected to drying processing if necessary, and thereafter, the through holes having predetermined sizes are provided at the predetermined arrangement density by a punching operation, a thermal fusion operation or the like. Subsequently, the flexible-porous body is layered on an adhesive layer side of the sheet-shaped body provided with the through holes.

The automotive soundproofing material of the present invention can be applied to a door trim or the like, and can also be applied to a roof, an instrument panel, a floor or the like. The automotive soundproofing material of the present invention is capable of providing not only the above-described soundproofing effect but also a heat shielding effect to prevent heat and coldness from invading into the automobile interior by virtue of the configuration of the automotive soundproofing material.

Here, several types of automotive soundproofing materials were practically fabricated and their sound absorption characteristics were investigated.

Flexible-porous bodies used herein were made of urethane resin having open cells (urethane foam), and thickness weight, and average cell diameter thereof were 10 mm, 160 g/m$^2$, and 0.5 mm respectively. The average cell diameter was obtained by the following processes: taking an enlarged picture of the cross section of the urethane foam by utilizing an optical microscope, measuring diameters of approximately 30 cells on the picture, and averaging the measured values.

As for the sheet-shaped body, a flexible sheet made of vinyl chloride resin having thickness of 80 μm was utilized, an aperture ratio thereof was determined to 0% (no apertures are present) as it is, and a double-faced adhesive tape for urethane resin was pasted on the entire region of one surface of this sheet-shaped body having the aperture ratio of 0%.

As opposed to the above-described sheet-shaped bodies having an aperture ratio of 0% that are provided with the adhesive layers, two types of sheet-shaped bodies provided with the through holes and the adhesive layers were prepared. One of the sheet-shaped bodies has an aperture ratio of 15% because of the presence of through holes provided by a punching process (a plurality of through holes each having a diameter of 5 mm were formed such that the aperture ratio is to be amounted to 15% and one of them is located at a center of the square sheet-shaped body, and four through holes thereof are located at the four apexes of the squared sheet-shaped body respectively), and the other sheet-shaped body has an aperture ratio of 30% that is provided by a process as well (through holes were each formed in the same manner as those of the sheet-shaped body having the aperture ratio of 15% except for the each of diameter of the through holes being 10 mm).

The above-described flexible-porous bodies are respectively layered on and adhered to the adhesive layers of the sheet-shaped bodies each having adhesive layer on one side thereof thus formed to possess the aperture ratios of 0%, 15% and 30% respectively. Thereby, three types of automotive soundproofing materials are produced.

The evaluations of the sound absorption characteristics of a flexible-porous body (aperture ratio: 100% [no sheet-shaped body is layered thereon]) on which no sheet-shaped body was layered, were conducted in addition to those of these three types of automotive soundproofing materials.

More specifically, the evaluations were conducted in accordance with the JIS standard (the sound was made to be incident from the sheet-shaped body side). Results thereof are shown in FIG. 3.

Figure 3:
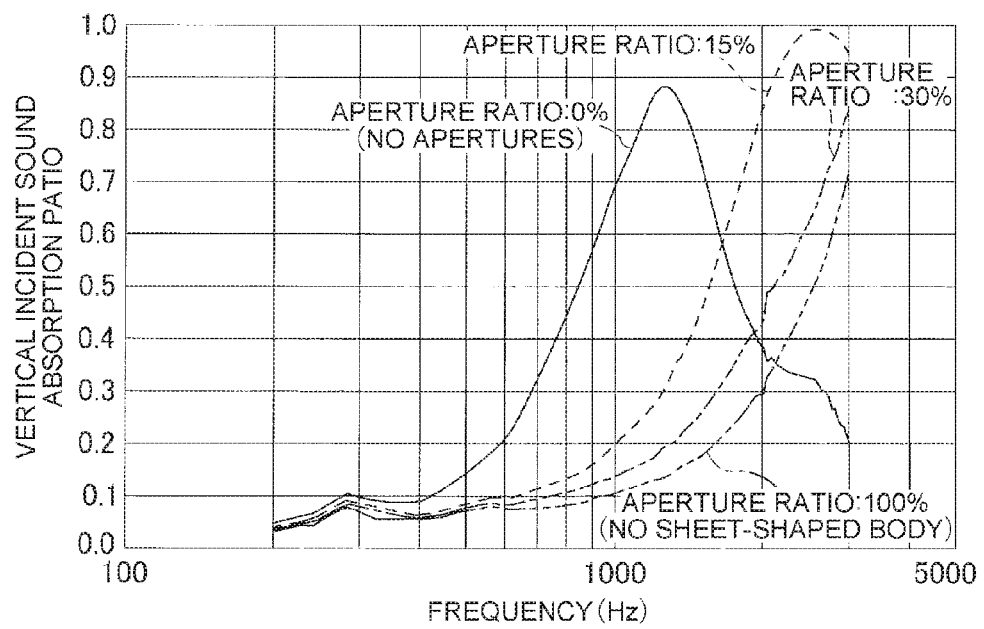
FIG. 3 is a graph showing a contrast in sound absorption characteristics caused by different aperture ratios of the sheet-shaped body.

It can be seen from FIG. 3 that the automotive soundproofing materials having aperture ratios ranging from 15% to 30%, which are the examples of the present invention possess sound absorption characteristics that are not equivalent to those of the automotive soundproofing material having the aperture ratios of 0% and 100% (these are conventional products), and are able to provide high sound absorption performance throughout the wide frequency band.

Hereinafter, an example in which the automotive soundproofing material of the present invention is applied to a wire harness assembly is described by referencing FIG. 4 which depicts the schematical illustration of the assembling.

This wire harness assembly 2 is arranged between a door panel and a door trim (those are not shown), and serves as a soundproofing material as well.

In this example, a wire harness 3 is composed of a flat cable, transmits various electric signals, and supplies electric power. The wire harness 3 is arranged between a flexible-porous body 2a and a sheet-shaped body 2b which are multi-layered and adhered to each other. The sheet-shaped body 2b is comprised of a plurality of through holes 2b1 formed therethrough. Although the wire harness composed of the flat cable is used in this example, a wire harness composed of bundled electric wires may also be used. In such a case, recess in which the wire harnesses is to be routed or to be wired may be provided on a surface of the sheet-shaped body side of the flexible-porous body.

In a case utilizing such a wire harness assembly, in order to obtain a high protecting effect for the wire harness therewith, through holes may not be provided in portions where the wire harness is to be routed or wired.

Figure 4:
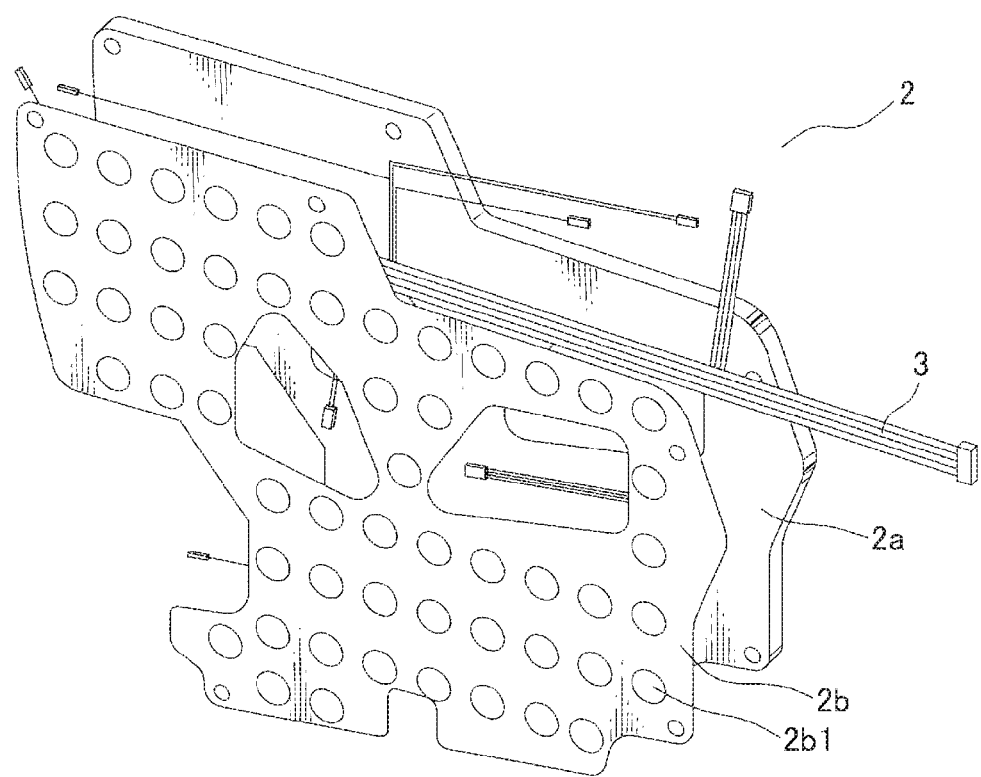
FIG. 4 is a schematical assembling illustration of an example 2 of a wire harness assembly of the present invention.

In the wire harness assembly 2 thus assembled as shown in FIG. 4, a wiring operation of the wire harness to be carried out into inside of the door trim becomes unnecessary, and a member for protecting the wire harness and a member for fixing the wire harness in the door trim also become unnecessary. Thereby, a reduction of cost and weight is made enabled.

Although the present invention has been described based on the above-described preferred embodiments (examples), the automotive soundproofing material and the wire harness assembly of the present invention are not necessarily limited to the configurations of the above-described embodiments.

A person skilled in the art can arbitrarily modify the automotive soundproofing material and the wire harness assembly of the present invention in accordance with the well-known techniques. The modified automotive soundproofing material and wire harness assembly of the present invention are yet within the scope of the present invention insofar as they have equivalent configurations of the automotive soundproofing material and the wire harness assembly to those of the above.

REFERENCE SIGNS LIST

1: example of automotive soundproofing material of the present invention
1a, 2a: flexible-porous body
1b, 2b: sheet-shaped body
1b 1, 2b1: through hole
2: example of wire harness assembly of the present invention
3: wire harness

The invention claimed is:

1. A wire harness assembly comprising:
   an automotive soundproofing material including:
      a flexible-porous body; and
      a sheet-shaped body, with the flexible-porous body and the sheet-shaped body in a multi-layered structure; and
   a wire harness arranged in order of the flexible-porous body, the wire harness and the sheet-shaped body,
   wherein a portion of the sheet-shaped body where the wire harness is avoided to be arranged is comprised of a plurality of through holes formed therethrough,
   wherein an aperture ratio of the sheet-shaped body ranges from 3% to 40%.

2. The wire harness assembly according to claim 1, wherein a surface of the flexible-porous body on a side of the sheet-shaped body is provided with a recess in which the wire harness is to be routed.

3. The wire harness assembly according to claim 1, wherein the sheet-shaped body is made of vinyl chloride resin, polyethylene, polypropylene, polystyrene or elastomers.

4. The wire harness assembly according to claim 1, wherein a diameter of each through hole when circularly formed, and/or an equivalent circle diameter of each through hole when not circularly formed ranges from 2.5 mm to 10 mm.

5. The wire harness assembly according to claim 1, wherein a distance between adjacent two through holes ranges from 10 mm to 18 mm.

6. The wire harness assembly according to claim 1, wherein the flexible-porous body and the sheet-shaped body is thermal-fusion bonded to each other.

7. The wire harness assembly according to claim 1, wherein the wire harness is directly contacting both the flexible-porous body and the sheet-shaped body.

* * * * *